United States Patent [19]

Morehouse et al.

[11] Patent Number: 5,296,986

[45] Date of Patent: * Mar. 22, 1994

[54] ROTARY INTERTIAL LATCH FOR DISK DRIVE ACTUATOR TO PROTECT AGAINST ROTATIONAL SHOCK FORCE

[75] Inventors: James H. Morehouse, Longmont; James A. Dunckley; David M. Furay, both of Boulder; Richard K. Thompson, Berthoud; Robert A. Alt, Longmont, all of Colo.

[73] Assignee: Integral Peripherals, Inc., Boulder, Colo.

[*] Notice: The portion of the term of this patent subsequent to Feb. 23, 2010 has been disclaimed.

[21] Appl. No.: 765,353

[22] Filed: Sep. 25, 1991

Related U.S. Application Data

[63] Continuation-in-part of Ser. No. 629,929, Dec. 19, 1990, Pat. No. 5,189,576.

[51] Int. Cl.$^5$ ............................ G11B 5/55; G11B 5/54
[52] U.S. Cl. ..................................... 360/106; 360/75; 360/86; 360/105; 369/215; 369/292
[58] Field of Search ................. 360/105, 106, 902, 77, 360/77.04, 97.01, 109, 128, 75, 86; 369/215, 203, 292

[56] References Cited

U.S. PATENT DOCUMENTS

| | | | |
|---|---|---|---|
| 3,984,873 | 10/1976 | Pejcha | 360/105 |
| 4,518,904 | 5/1985 | MacLeod et al. | 360/78 |
| 4,535,374 | 8/1985 | Anderson et al. | 360/103 |
| 4,559,571 | 12/1985 | Olmsted et al. | 360/105 |
| 4,562,500 | 12/1985 | Bygdnes | 360/105 |
| 4,568,988 | 2/1986 | McGinlay et al. | 360/77 |
| B1 4,568,988 | 11/1989 | McGinlay et al. | 360/77 |
| 4,638,383 | 1/1987 | McGinlay et al. | 360/77 |
| B1 4,638,383 | 11/1988 | McGinlay et al. | 360/77 |
| 4,647,997 | 3/1987 | Westwood | 360/105 |
| 4,716,480 | 12/1987 | Wiens et al. | 360/105 |
| 4,725,907 | 2/1988 | Jue | 360/105 |
| 4,796,130 | 1/1989 | Shimanuki | 360/105 |
| 4,796,131 | 1/1989 | Chang | 360/106 |
| 4,839,756 | 6/1989 | Chew et al. | 360/105 |
| 4,933,785 | 6/1990 | Morehouse et al. | 360/78.04 |
| 4,996,617 | 2/1991 | Yaeger et al. | 360/105 |
| 5,023,736 | 6/1991 | Kelsic et al. | 360/105 |
| 5,134,608 | 7/1992 | Strickler et al. | 360/105 |
| 5,161,770 | 11/1992 | Morehouse et al. | 360/133 |
| 5,162,959 | 11/1992 | Arin et al. | 360/105 |
| 5,189,576 | 2/1993 | Morehouse et al. | 360/105 |
| 5,216,662 | 6/1993 | Stefansky et al. | 360/105 |

FOREIGN PATENT DOCUMENTS 0255240 2/1988 European Pat. Off. .

OTHER PUBLICATIONS

Quantum Corporation, *Technical Highlights*: Go-Drive Series, ProDrive Gem Series Sep. 1990, pp. 1-5 and 3 unnumbered pages.

*Primary Examiner*—Paul M. Dzierzynski
*Assistant Examiner*—Kim-Kwok Chu
*Attorney, Agent, or Firm*—Skjerven, Morrill, MacPherson, Franklin & Friel

[57] ABSTRACT

A rotary inertial latch is disclosed for maintaining the actuator of a disk drive in its proper position when the drive is not in operation.

21 Claims, 16 Drawing Sheets

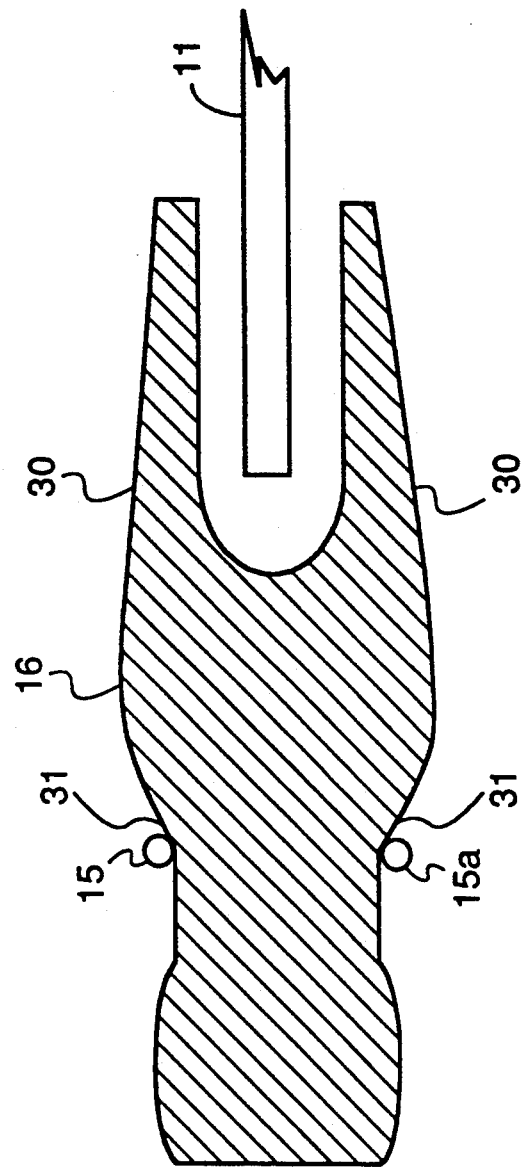

ically balanced...

ROTARY INERTIAL LATCH FOR DISK DRIVE ACTUATOR TO PROTECT AGAINST ROTATIONAL SHOCK FORCE

This application is a continuation-in-part of application Ser. No. 07/629,929, filed Dec. 19, 1990, now U.S. Pat. No. 5,189,576.

FIELD OF THE INVENTION

This invention relates to the field of disk drives, and in particular to disk drives used in laptop, hand held or other small computers.

BACKGROUND OF THE INVENTION

In computer systems, information is frequently stored in a magnetic film on the surface of a hard or soft disk. The information is stored in concentric tracks in the magnetic film, and it is written to or read from the film by means of a magnetic head or transducer. When storing or retrieving data, the magnetic head rides on a thin laminar boundary layer of air over the rapidly rotating disk, thereby avoiding direct contact with the magnetic surface.

On most disk drives, the magnetic head or transducer is mounted near the end of a member commonly referred to as an actuator. Two configurations of actuators, linear and rotary, have been widely used. In the linear configuration, the actuator is mounted with the magnetic head pointing directly toward the center of the disk and the actuator moves linearly along a radial line to position the magnetic head at a desired position above the magnetic surface of the disk. In the rotary configuration, the actuator rotates about a pivot point near the circumference of the disk, with the magnetic head swinging so as to define an arc over the surface of the disk.

Two further categories of disk drives are defined by the position of the read/write head when the drive is not operating. In "dynamic loading" drives, the head is withdrawn to a position away from the disk (typically on a ramp), whereas in "contact start/stop" (CSS) drives, the head is moved to a "park" position, that is, a position on a nondata zone of the disk (typically near the center) which is reserved for take-offs and landings and resting when the CSS drive is not operating. When the drive is not operating, it is important that the head be restrained on its ramp or other restraining structure if the drive is a dynamic loading type, and that it be restrained in its "park" position on the surface of the disk if the drive is a CSS type. Any abnormal contact between the head and the disk may create a stiction or adhesion or may otherwise damage the head and/or the disk.

Several mechanisms have been proposed to lock the actuator in its proper position when the drive is not in operation. In some drives, the actuator becomes engaged to a passive magnetic or spring-loaded latch when the drive is turned off, the holding force of the latch being overcome by the actuator motor when the drive is turned on again. These mechanisms are vulnerable to becoming disengaged and releasing the actuator if the computer is subjected to a shock force, for example by being bumped or dropped, while not in operation.

Other protective mechanisms rely on a spring-loaded latch and solenoid, the solenoid allowing the spring-loaded latch to restrain the actuator when the power is off and being energized so as to release the actuator when the power is on. While such mechanisms do provide some measure of protection against shock forces when the drive is not operating, solenoid latches tend to be expensive and unreliable, and they consume power while the drive is operating. Moreover, since a very weak spring must be used to avoid the need for a large power-consuming solenoid, even a solenoid latch may be disengaged if the computer is subjected to a strong external shock force. Examples of such mechanism are disclosed in U.S. Pat. No. 4,716,480, issued Dec. 29, 1987 to Wiens et al., and U.S. Pat. No. 4,725,907, issued Feb. 16, 1988 to Jue, both of which operate with linear rather than rotary actuators.

Rotary actuators are particularly vulnerable to rotational shocks and acceleration. Since a rotary actuator can be designed so that it is substantially balanced with respect to its pivot point, a purely translational shock will operate equally on both ends and will not cause the actuator to move with respect to the rest of the disk drive. Any small imbalances that are due to typical manufacturing variations will not normally create an inertial force large enough to overcome a passive latching mechanism. On the other hand, it is critical to provide protection against the inertial forces arising from rotational shocks, since these may easily cause the rotary actuator to swing about its pivot point, thereby bringing the magnetic head into unwanted contact with the disk. This need has become all the more pressing with the advent of laptop and even smaller computers. These computers operate in a particularly sever environment, and they may readily be subjected to strong rotational forces as they are jarred, bumped and sometimes dropped when being carried about or otherwise not in use.

SUMMARY OF THE INVENTION

In a inertial latch according to this invention, an inertial body is mounted on a shaft which is substantially parallel to the axis about which a rotary disk drive actuator pivots. The inertial body includes a pin or other member which is capable of engaging a corresponding finger or other member on the actuator so as to prevent the actuator from rotating. The inertial body is free to rotate about its shaft, but a small spring biases it in an unlocked position, with the corresponding locking members of the inertial member and actuator held apart, when the computer is not being subjected to rotational forces.

On the other hand, when the computer is subjected to a strong rotational force or shock, the main body of the disk drive accelerates angularly in the direction of the force. The inertial body is free to rotate, however, and since its moment of inertia is sufficient to overcome the force of the spring, it does not accelerate with the rest of the disk drive. The result is relative rotation between the inertial body and disk drive which, assuming that the shock is in a direction which would tend to swing the head toward the disk, brings the corresponding locking members of the inertial body and actuator into engagement and thereby prevents the actuator from angular movement with respect to the remainder of the disk drive.

An inertial latch in accordance with the invention is simple, reliable and consumes no electrical power. This makes it particularly suitable for miniature computers, which are often battery operated.

While an inertial latch is described herein in conjunction with a disk which stores information in a magnetic medium, the principles of this invention are equally applicable to disk drives which use other types of storage disks, for example, magneto-optic and conventional phonographic disks. Moreover, the principles of this invention are applicable to CSS disk drives and "dynamic loading" drives alike.

BRIEF DESCRIPTION OF THE DRAWINGS

FIG. 3 is a side view of the ramp and related elements shown in FIG. 1.

DETAILED DESCRIPTION OF THE INVENTION

Figure 1:
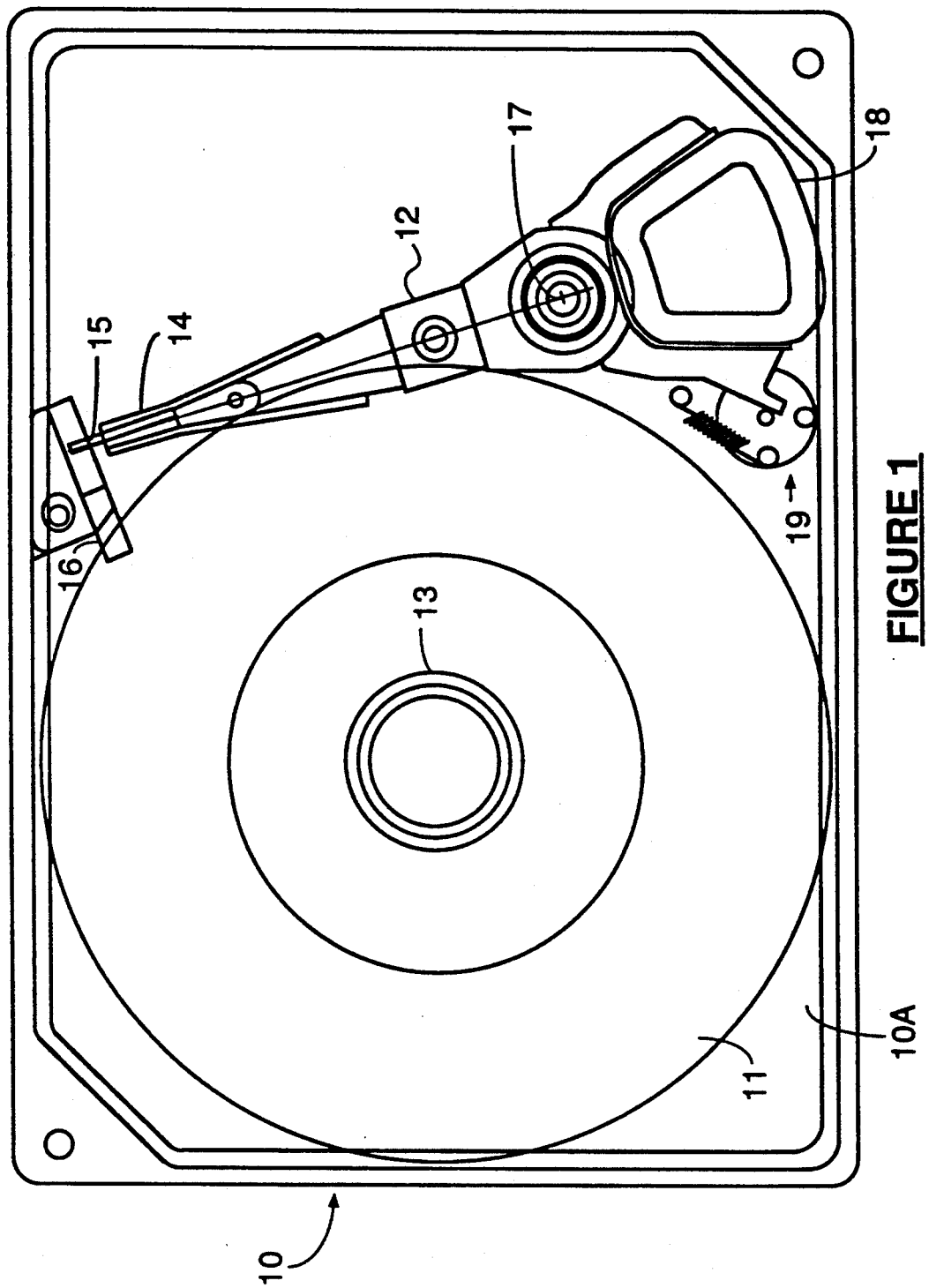
FIG. 1 is a general overhead view of a dynamic loading disk drive, showing the relative positions of a rotary actuator and an inertial latch in accordance with this invention.

FIG. 1 shows a general overhead view of a dynamic loading disk drive 10, which includes a drive body 10A, a disk 11 and a rotary actuator 12. Disk 11 is driven by and rotates around a combined spindle and motor 13. At one end of actuator 12 are mounted a magnetic head 14 and a cam follower 15, the latter of which rides on a ramp 16. FIG. 3 shows the structure of cam follower 15 and ramp 16 in more detail.

Actuator 12 rotates about pivot shaft 17 and is driven by an actuator coil 18 in conjunction with a magnet assembly (not shown) which together make up a voice coil motor which swivels actuator 12 so as to position magnetic head 14 over a desired location on disk 11. Positioned adjacent an end of actuator 12 is an inertial latch 19, which will now be described in greater detail with reference to FIG. 2A.

Figure 2A:
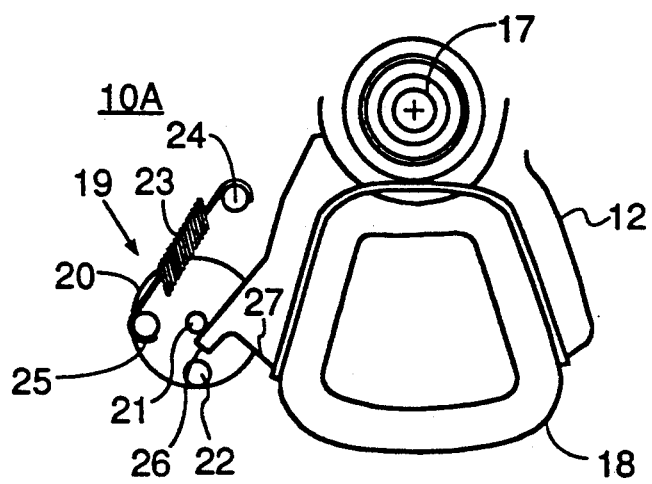
FIGS. 2A and 2B show a portion of a rotary actuator and an inertial latch in accordance with the invention, with the latch in unlocked and locked positions, respectively.

FIG. 2A shows inertial latch 19 when it is in an open or unlocked condition. One end of a shaft 21 is journaled into an inertial body 20 so as to allow inertial body 20 to rotate in either direction. The other end of shaft 21 is attached to body 10A. Inertial body 20 is shown as being circular in FIG. 2A, but this is not in any respect intended to be limiting. Inertial body 20 may be configured in virtually any shape, since its shape is not critical to its operation. A locking pin 22 is attached to the surface of inertial body 20. When inertial latch 19 is in its unlocked condition, as shown in FIG. 2A, the angular position of locking pin 22 about shaft 21 is determined by a coil spring 23, which extends between a pin 24 joined to drive body 10A and a pin 25 joined to inertial body 20. A finger 26 protrudes from actuator 12, adjacent to which is a striking surface 27, which is aligned to be in the path of pin 22 as it rotates in a counterclockwise direction.

When drive 10 is not operative, magnetic head 14 is normally restrained by the structure shown in FIG. 3, which shows ramp 16 viewed from the side away from actuator 12. This structure is described in greater detail in copending and commonly assigned U.S. patent application Ser. No. 07/629,948 of J. Morehouse et al. filed on Dec. 19, 1990 and entitled: "Miniature Hard Disk Drive For Portable Computer" which is incorporated herein by reference in its entirety. As shown in FIG. 3, cam follower 15 is mirrored by a similar cam follower 15a beneath ramp 16. Cam followers 15 and 15a encounter inclines 30 on ramp 16 when they swing away from disk 11. As cam followers 15 and 15a slide further leftward along inclines 30, magnetic head 14 is lifted away from the surface of disk 11, until cam followers 15 and 15a reach locking positions 31. A stop (not shown) prevents cam followers 15 and 15a from moving substantially beyond locking positions 31.

Figure 2B:
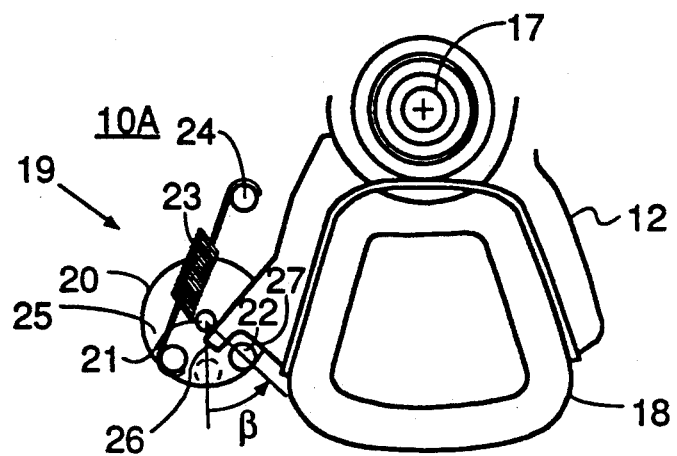

The operation of inertial latch 19 will now be described. When the disk drive is turned off, cam followers 15 and 15a normally rest in locking positions 31, and inertial latch 19 is in the unlocked condition shown in FIG. 2A. The frictional force between cam followers 15 and 15a and ramp 16 is enough to restrain actuator 12 from swinging as a result of a minor rotational shock. If disk drive 10 incurs a strong clockwise rotational force, however, actuator 12 will tend to rotate in a counterclockwise direction with respect to body 10A, potentially allowing magnetic head 14 to make contact with disk 11. In this case, the inertia of inertial body 20 will overcome the force of spring 23, and inertial body 20 will also rotate in a counterclockwise direction with respect to body 10A. Pin 22 will therefore rotate through an angle $\beta$ as shown in FIG. 2B until it strikes surface 27. In this position, pin 22 blocks any appreciable movement of arm 26 to the right and thereby prevents actuator 12 from rotating in a counterclockwise direction. Following the shock, spring 23 will urge inertial body 20 back to the unlocked position shown in FIG. 2A, and cam followers 15 and 15a will return to locking positions 31.

If disk drive 10 incurs a strong counterclockwise force, no problem will arise since actuator 12 will tend to rotate clockwise with respect to body 10A until it reaches the stop (not shown), after which cam followers 15 and 15a will return to locking positions 31.

It will be apparent that the effective operation of inertial latch 19 depends in part on the correct adjustment of the torque impressed by spring 23 on inertial body 20 as compared with the moment of inertia of inertial body 20. To assure that inertial latch responds to a rotational force which would cause actuator 12 to pivot, the following condition should be satisfied:

$$\frac{T_{spring}}{J_{latch}} < \frac{T_{ramp}}{J_{actuator}}$$

where $T_{spring}$ is the torque applied by coil spring 23, $J_{latch}$ is rotational inertia of inertial latch 19, $T_{ramp}$ is the torque applied to actuator 12 by the resistance between cam followers 15 and 15a and ramp 16, and $J_{actuator}$ is the rotational inertia of actuator 12.

In practice, it has been found that spring 23 should exert just enough force to maintain latch 19 in an unlocked condition when disk drive 10 is not being exposed to significant rotational forces.

It should be stressed that the configuration shown in FIGS. 2A and 2B, including inertial body 20, pin 22 and finger 26 is illustrative only. As noted above, inertial body 20 need not be round and can in fact assume a wide variety of shapes and sizes. Pin 22 and finger 26 may be replaced by any two members or devices which are capable of engaging or interlocking in any way upon the rotation of inertial body 20, so as to prevent actuator 12 from rotating in a manner to threaten contact between magnetic head 14 and disk 11. While inertial body 20 is shown as being positioned under actuator 12, this relationship likewise need not be adhered to. Inertial member 20 could be below actuator 12, above actuator 12, laterally adjacent actuator 12, or any combination of the foregoing. Moreover, inertial latch 19 need not be located at the position on housing 10A shown in FIG. 1 and FIGS. 2A and 2B. It can be located at a position adjacent any portion or surface of actuator 12. The moment of force applied by inertial latch 19 against the unwanted rotation of actuator 12 will, of course, be greater to the extent that inertial latch 19 is distanced from pivot 17.

Spring 23 may likewise be replaced by a variety of mechanisms that will maintain inertial latch 19 in an unlocked condition and prevent it from locking inadvertently when disk drive 10 is not being subjected to a rotational force. For example, an elastic or elastomeric device could be used in place of spring 23. A torsional spring could be placed around shaft 21, or spring 23 and shaft 21 could be integrated into a flexural spring pivot. A passive magnet might also be used to hold inertial member 20 in an unlocked position in normal situations.

Figure 4:
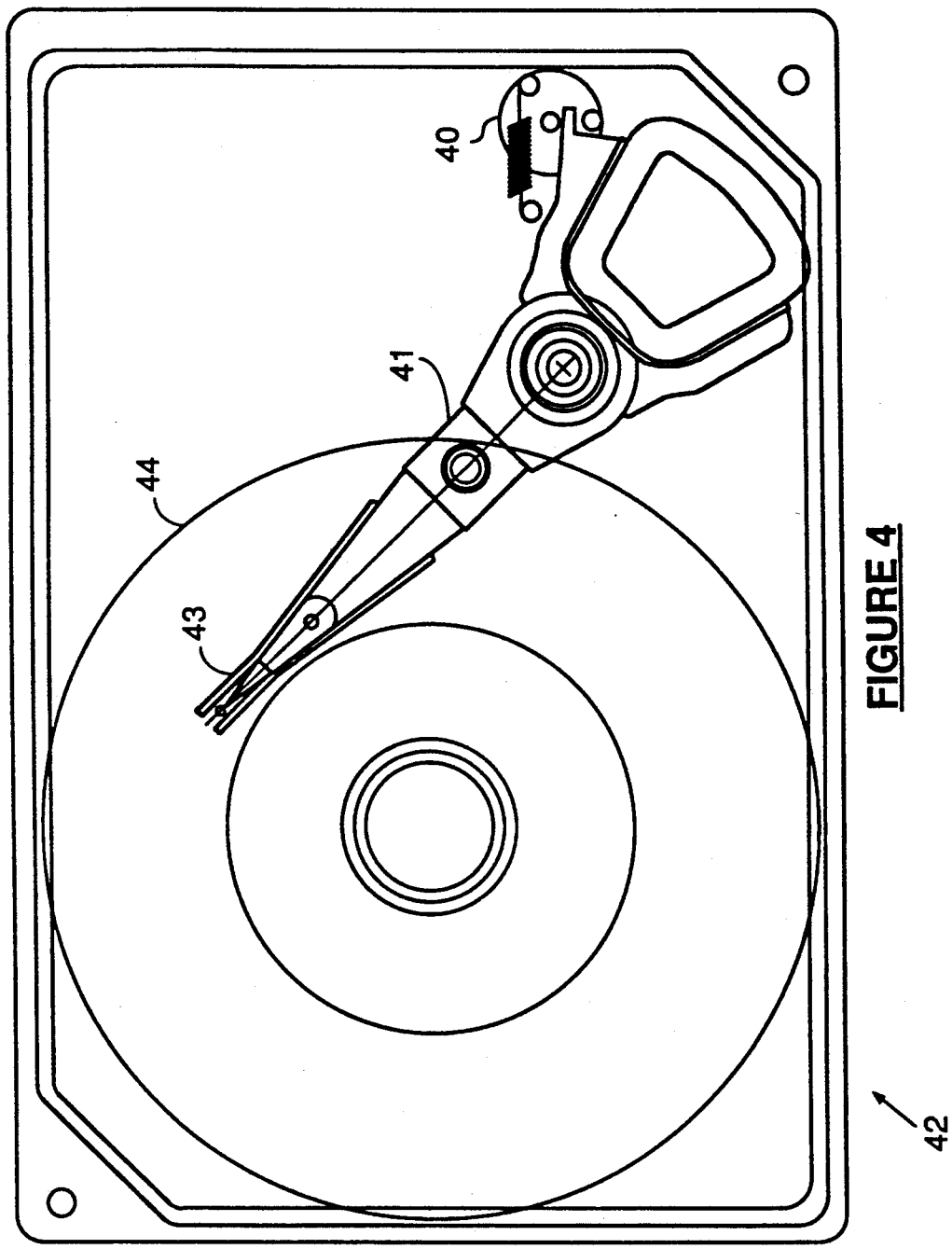
FIG. 4 is an overhead view of a contact start/stop (CSS) disk drive having an inertial latch in accordance with the invention.

An inertial latch according to this invention may also be used with a contact start/stop disk drive. Such an embodiment is shown in FIG. 4, where an inertial latch 40 is configured so as to prevent clockwise rotation of an actuator 41 with respect to the remainder of a contact start/stop disk drive 42. A head 43 is shown in its "parking" position on an inner portion of a disk 44 while disk drive 42 is not in operation. FIG. 4 shows inertial latch 40 in a locked condition, preventing head 43 from sliding across disk 44 in a clockwise direction when drive 42 encounters a counterclockwise rotational force.

Figure 5:
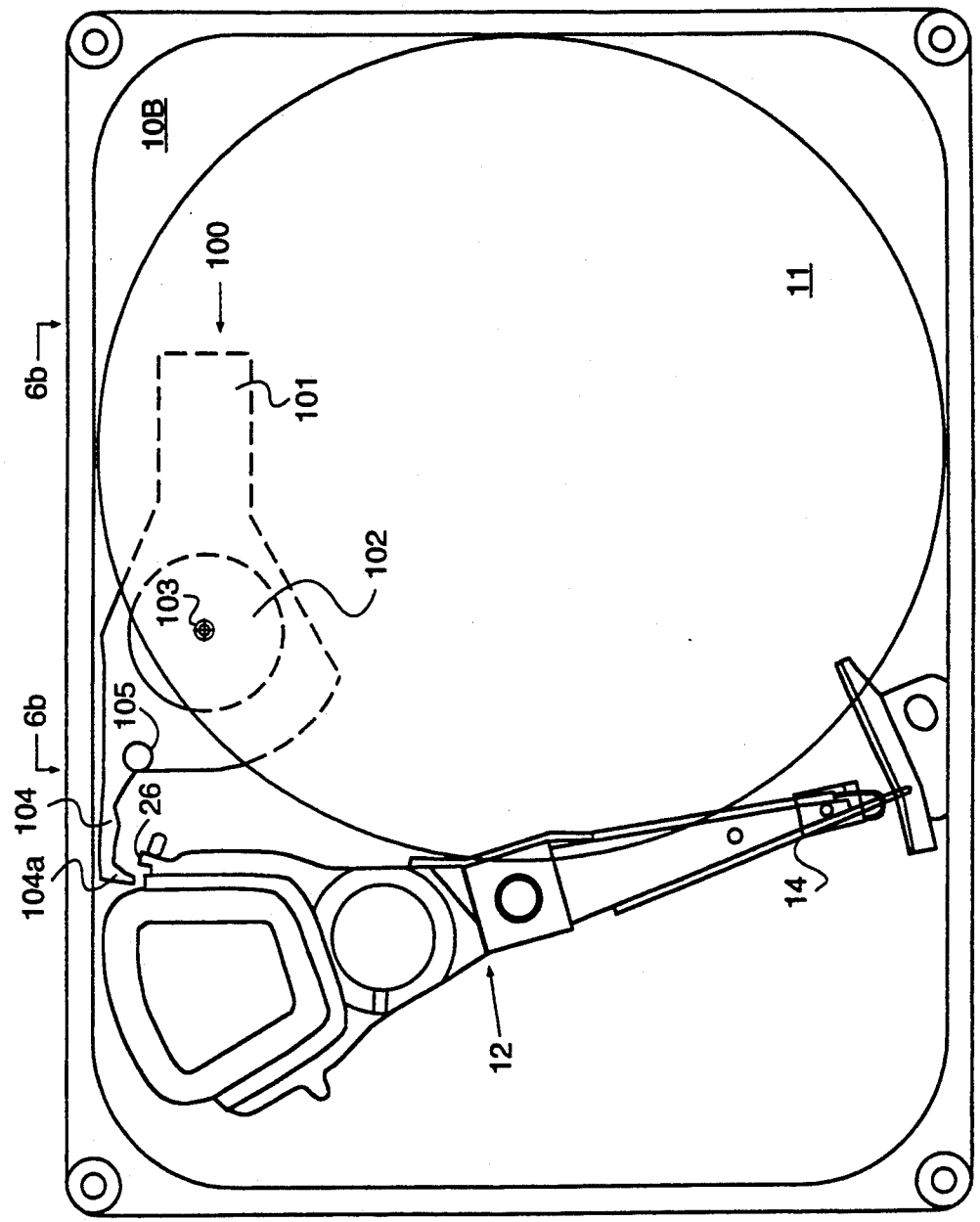
FIG. 5 illustrates a second embodiment of the invention.

A second embodiment in accordance with the invention is shown in FIG. 5. Inertial latch 100 includes an inertial body 101 and a sleeve 102. A shaft 103 is journaled into sleeve 102 so as to allow inertial latch 100 to rotate in either direction. The other end of shaft 103 is press fitted into body 10B. Shaft 103 may also be screwed or bonded into body 10B. Inertial latch 100 is retained on shaft 103 by means of a retaining ring (e.g., an "E"-clip) (not shown).

Inertial body 101 is formed at one end in the shape of a pawl 104 which terminates in a hook 104a, and shaft 103 is positioned on body 10B so that hook 104a is able to engage finger 26 of actuator 12. A pin 105 extends upward from the top surface of inertial body 101. While inertial body 101 and sleeve 102 are shown as separate components, they could be combined. As indicated by the hatched lines, inertial latch 100 is mounted beneath disk 11.

Sleeve 102 is preferably made of Teflon ™ filled polycarbonate and is press-fitted into inertial body 101. Inertial body 101 is manufactured of bronze (85% by mass) filled Nylon II ™.

Figure 6A:
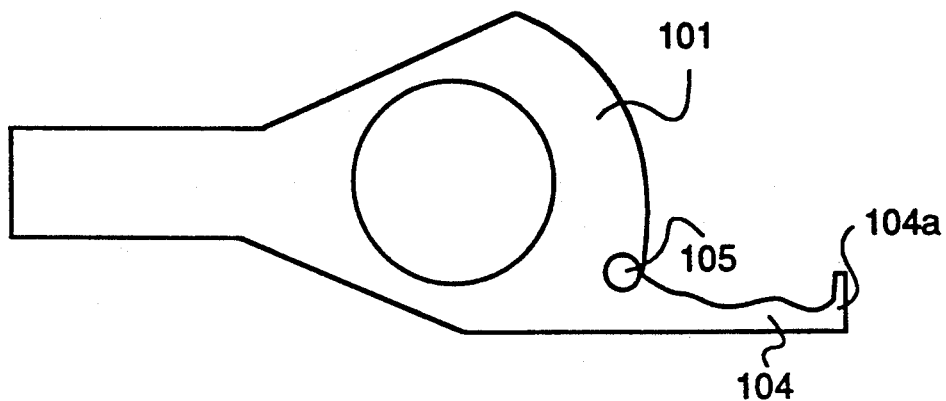
FIG. 6A and 6B illustrate top and side elevational views, respectively, of the inertial body in the embodiment of FIG. 5.
Figure 6B:
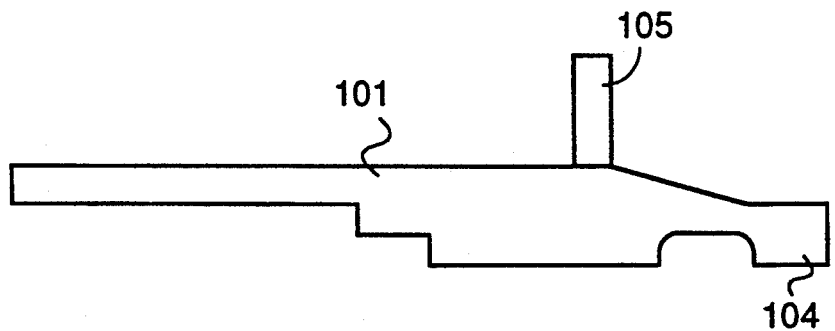

FIG. 6A shows a top view of inertial body 101, and FIG. 6B shows a side elevational view of inertial body 101 taken from the direction 6B shown in FIG. 5.

Figure 7:
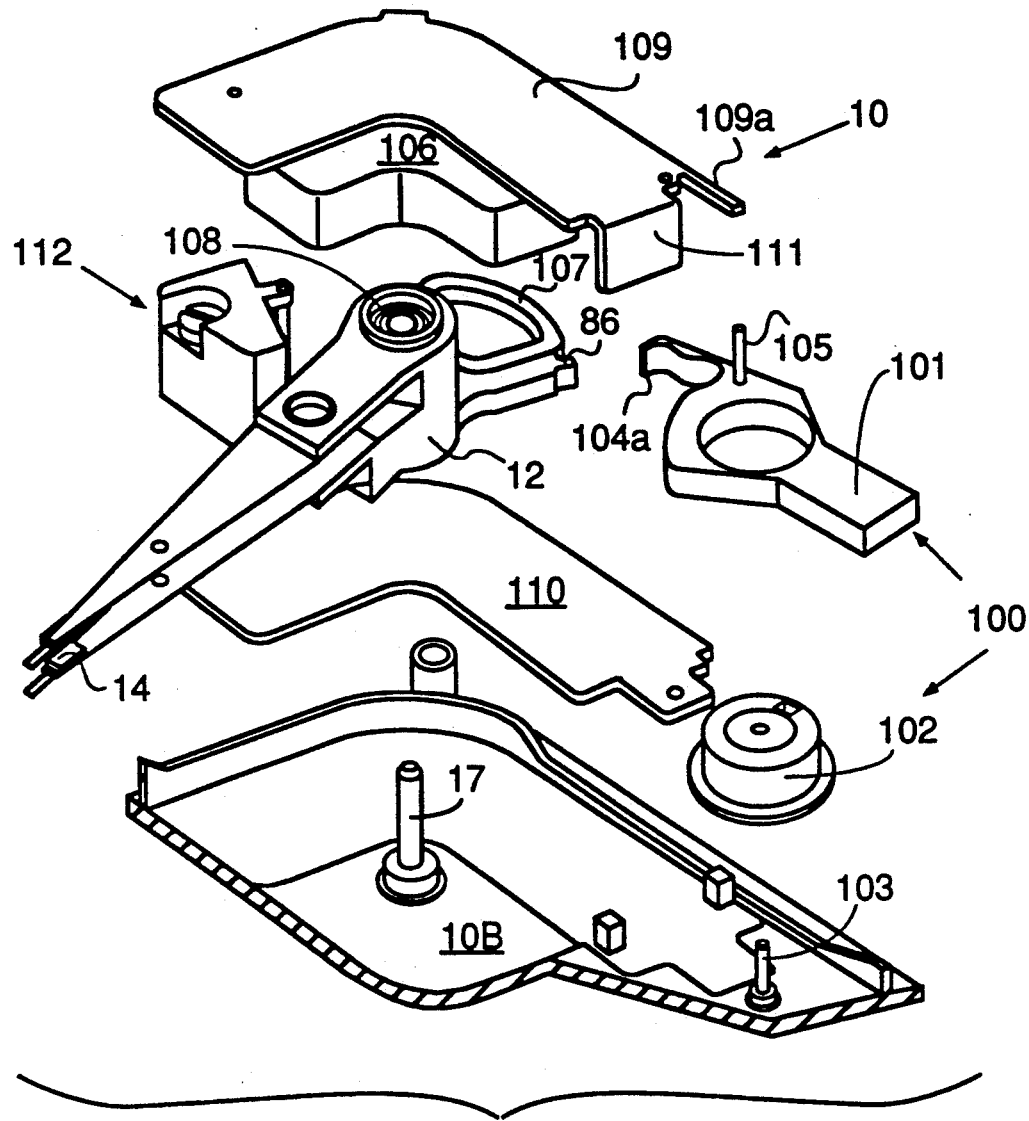
FIG. 7 is an exploded view showing how the inertial latch of FIG. 5 is mounted on a disk drive.

FIG. 7 is an exploded view of the corner portion of disk drive 10 where rotary actuator 12 and inertial latch 100 are positioned. Rotary actuator 12 is of the moving coil type, that is, a magnet 106 is maintained in a stationary position and the movable portion of the actuator 12 includes a coil 107. Included in actuator 12 is a bearing assembly 108 for rotatably supporting actuator 12 about pivot shaft 17 which is connected to body 10B. The flux field is established through actuator coil 107 through the use of magnet 106, which is supported on a top plate 109 to position the magnet 106 above the top surface of actuator 12. A lower plate 110 of the magnet assembly provides the lower portion of the flux path in conjunction with the down turned portion 111 of top plate 109. A tab 109a of top plate 109 serves as a stop for pin 105, thereby preventing inertial latch 100 from rotating too far in a clockwise direction. Inner crash stop assembly 112 is positioned between top plate 109 and lower plate 110. Inner crash stop assembly 112 prevents the rotation of actuator 12 beyond a predetermined inner travel to prevent the read/write transducer heads from leaving the surface of the disk or hitting other HDA components.

Figure 8B:
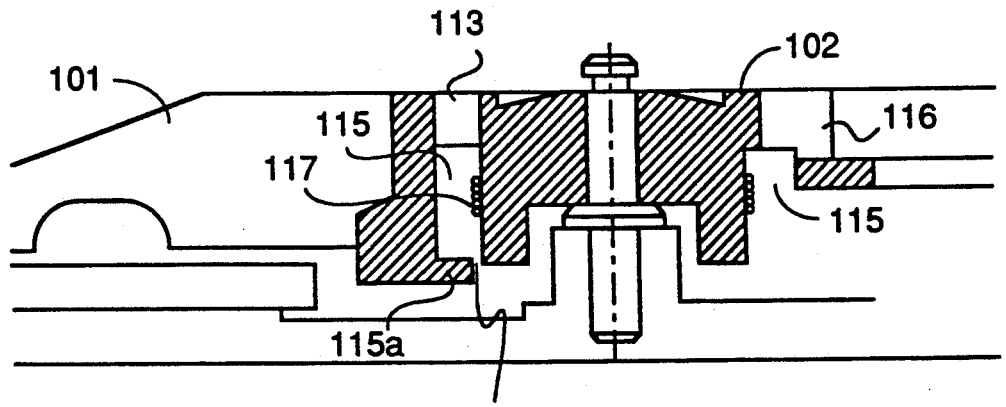
FIGS. 8A and 8B are top and side elevational views of the sleeve in the inertial latch of FIG. 5.
Figure 8A:
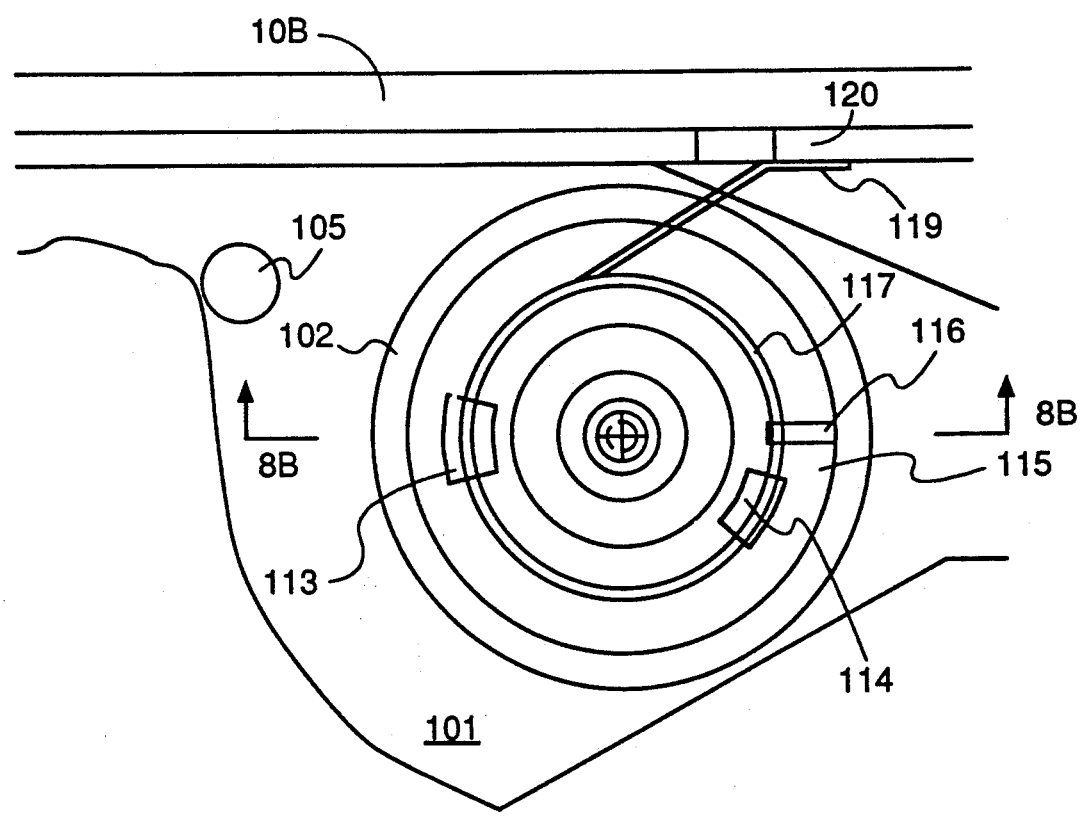

FIGS. 8A and 8B illustrate top and cross-sectional views, respectively, of sleeve 102. FIG. 8B is taken through section 8B as indicated in FIG. 8A.

Figure 9A:
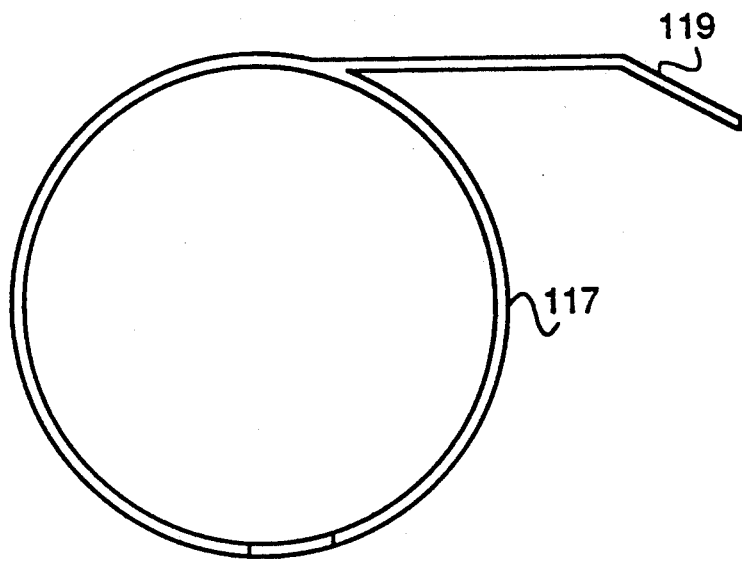
FIGS. 9A and 9B are top and side elevational views of the spring in the inertial latch of FIG. 5.
Figure 9B:
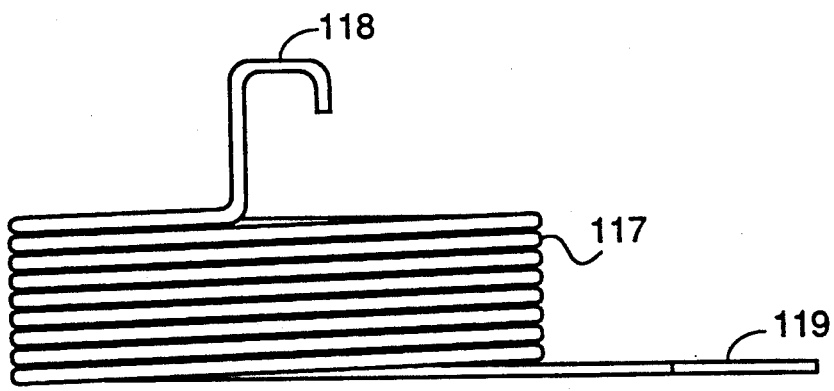

Sleeve 102 has formed in it two vertical channels 113 and 114, respectively, which extend from the top surface of sleeve 102 to a circular channel 115 which is formed in the interior of sleeve 102. Sleeve 102 also has a radial slot 116 formed in its top surface. A circular spring 117 is inserted into circular channel 115. Circular spring 117, as shown in FIGS. 9A and 9B, has at one end a hook 118 and at the other end a lateral arm 119.

When circular spring 117 is inserted into circular channel 115, hook 118 extends up through vertical channel 114 and the end of hook 118 is placed in radial slot 116, thereby securing circular spring 117 within sleeve 102. A finger 115a defines a narrow gap 115b and keeps spring 117 from slipping out of channel 115.

As shown in FIG. 8A, lateral arm 119 engages a wall 120 of body 10B. Thus, as inertial latch 100 is rotated in a counterclockwise direction, circular spring 117 is placed in tension and exerts a clockwise torque on inertial latch 100.

When disk drive 10 incurs a clockwise rotational shock, in the manner described above the rotational inertia of inertial latch 100 overcomes the torque of circular spring 117 and causes inertial latch 100 to rotate in a counterclockwise direction with respect to body 10B. Hook 104a therefore engages finger 26 of actuator 12 and prevents actuator 12 from rotating so as to bring magnetic head 14 into contact with disk 11. When the shock has passed, circular spring 117 takes over and brings inertial latch 100 back to its normal position, where pin 105 engages tab 109a (see FIG. 7).

Figure 10:
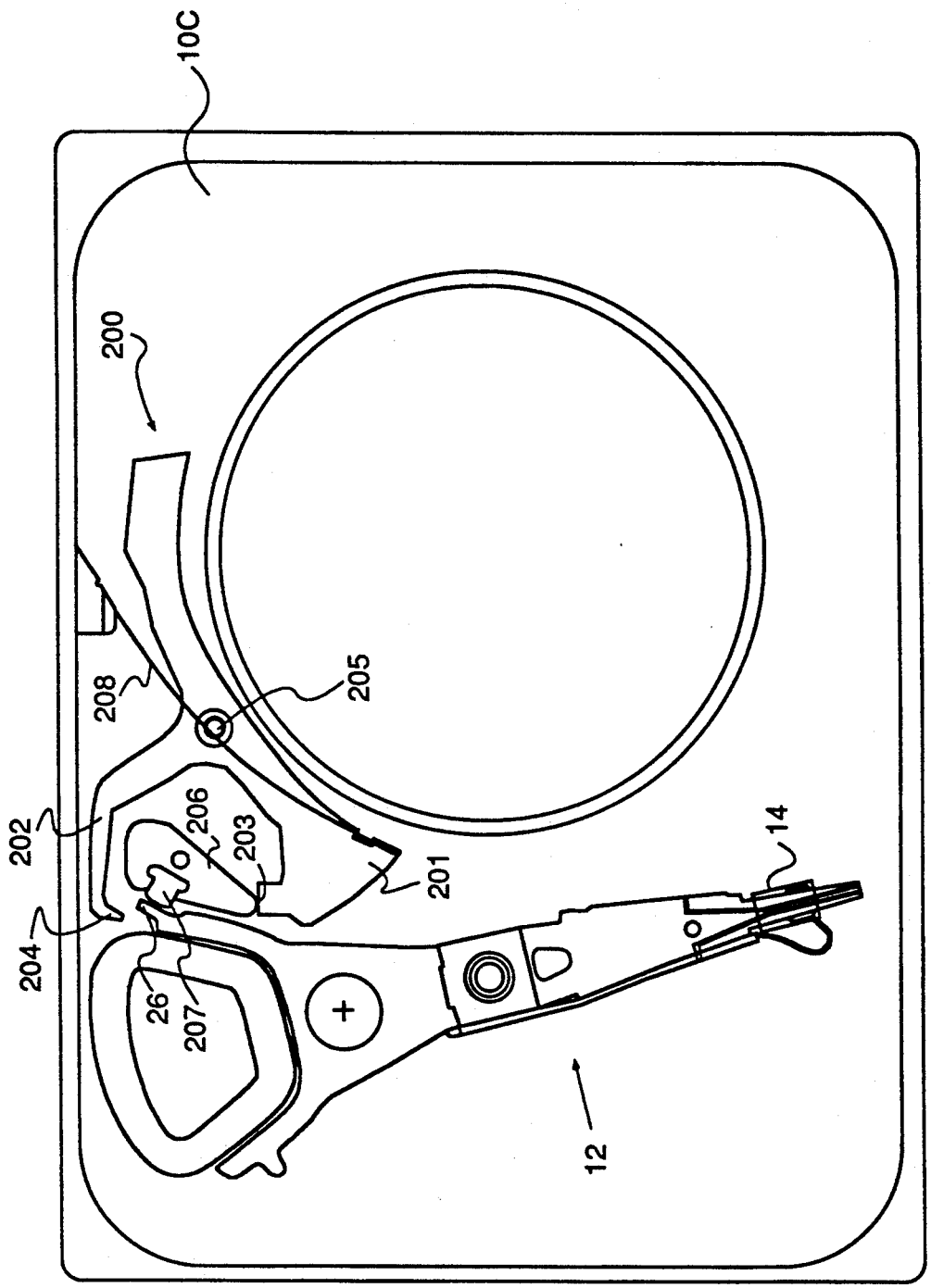
FIG. 10 illustrates a third embodiment of the invention.

A third embodiment in accordance with the invention is shown in FIG. 10. Inertial latch 200 has an arm 201 and a pawl 202. Arm 201 ends in a contact surface 203, and pawl 202 ends in a hook 204. Inertial latch 200 is rotatably mounted on a shaft 205, which is pressed into body 10C. Shaft 205 may also be screwed or bonded into body 10C. An outer crash stop block 206 is pinned to body 10C in a position between arm 201 and pawl 202. Outer crash stop block 206 has attached to it an outer crash stop 207, which is positioned opposite finger 26 so as to prevent actuator 12 from rotating too far in a clockwise direction.

Figure 11A:
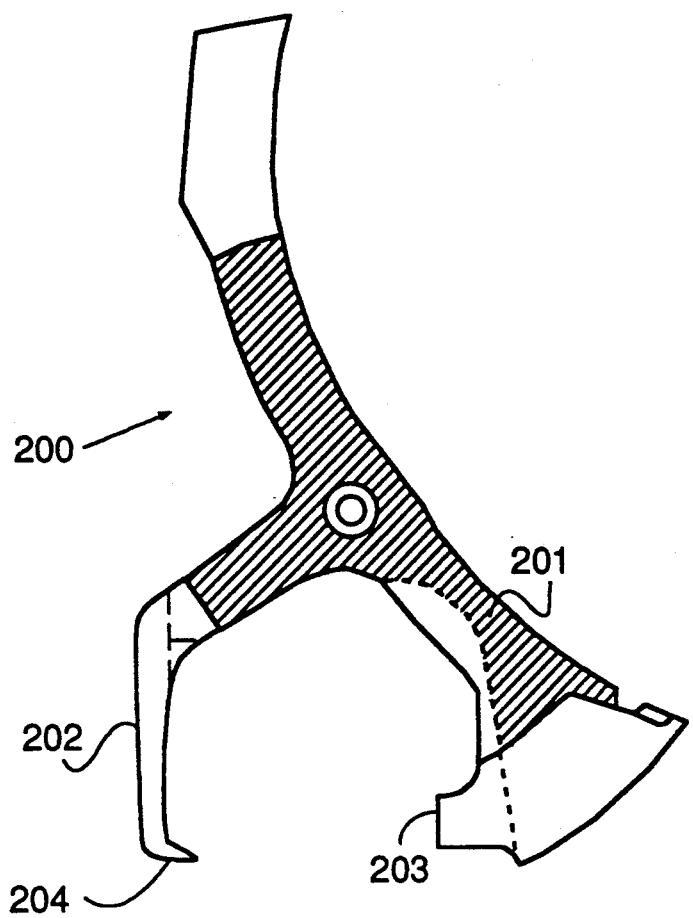
FIGS. 11A and 11B illustrate top and side elevational views, respectively, of the inertial latch of FIG. 10.
Figure 11B:
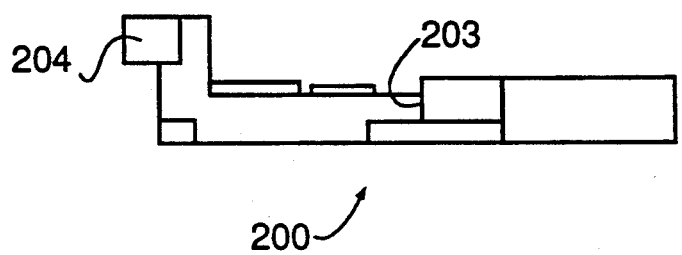

FIGS. 11A and 11B show top and side elevational views, respectively, of inertial latch 200. To maximize the rotational inertia of inertial latch 200 while minimizing its total mass, the central area of inertial latch 200 (shown by the cross hatching in FIG. 11A) has a reduced thickness as compared with the outer areas.

Figure 12:
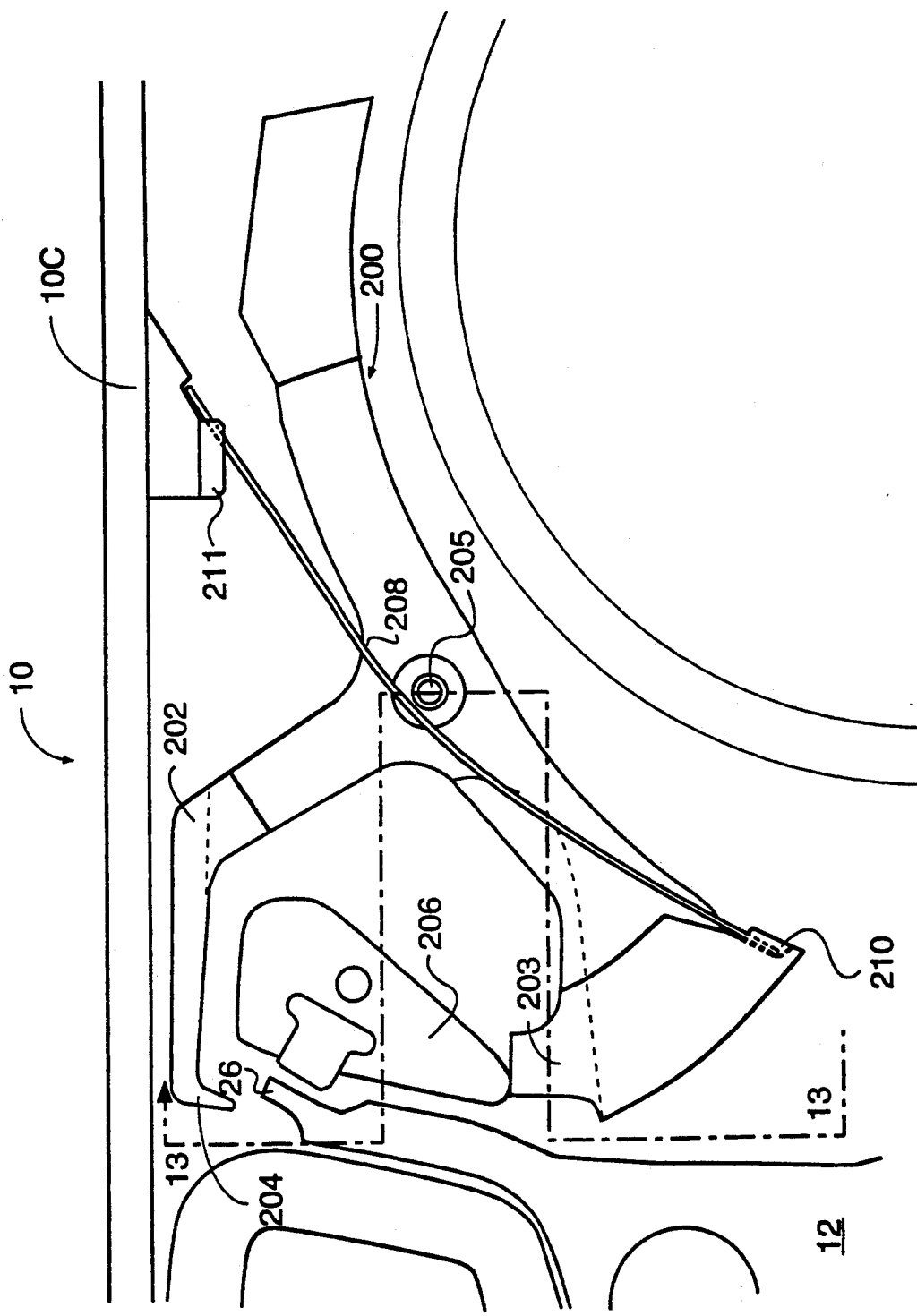
FIG. 12 is a detailed view showing how the inertial latch of FIG. 10 is mounted in a disk drive.
Figure 13:
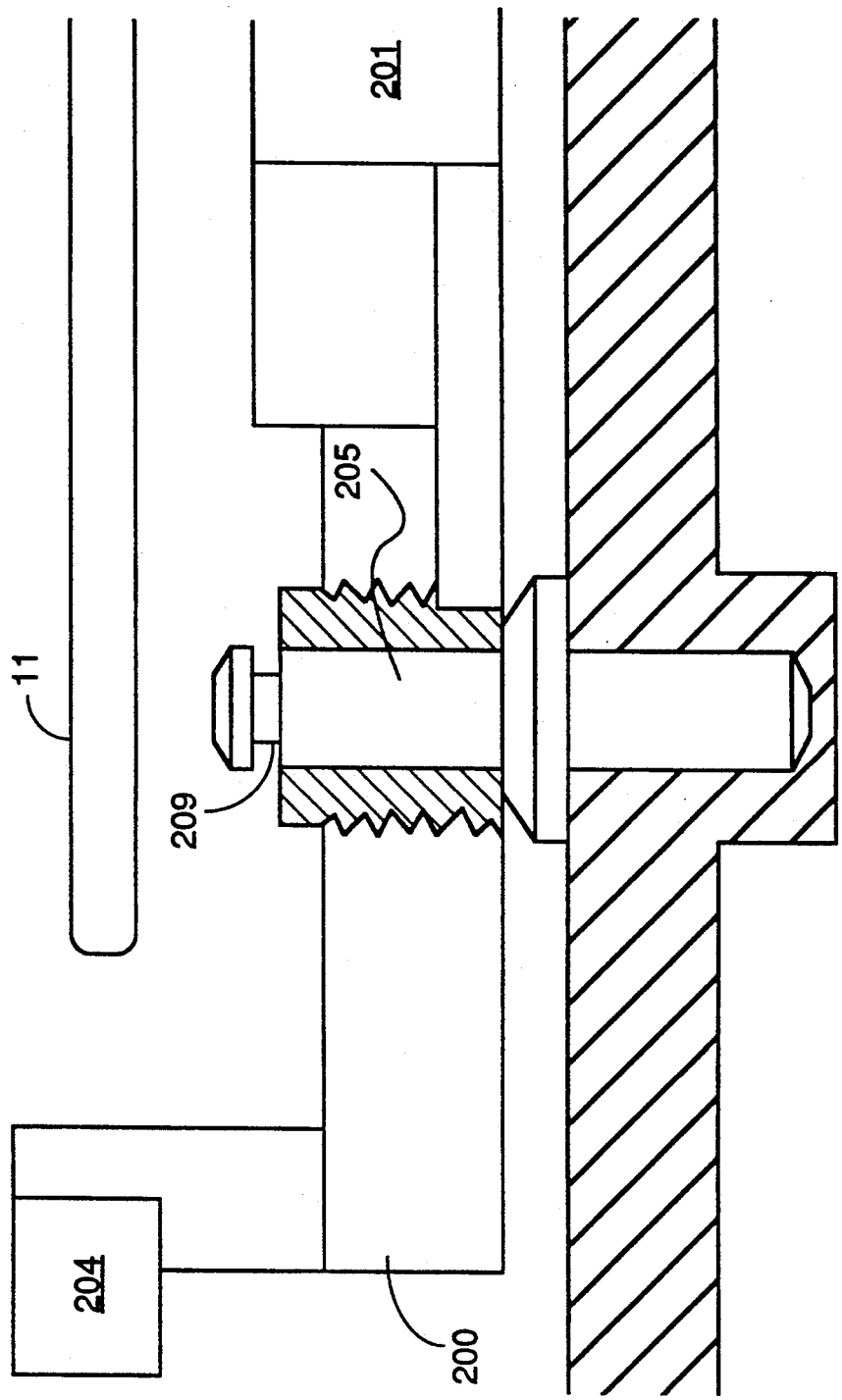
FIG. 13 is a detailed elevational view of the inertial latch of FIG. 10.

FIG. 12 illustrates a detailed top view of inertial latch 200 as mounted. A whisker spring 208 is placed on top of inertial latch 200. In the embodiment shown, whisker spring 208 has a circular cross section 0.005 inches in diameter, but it need not have a circular cross section. A leaf spring may be substituted for whisker spring 208. Whisker spring 208 fits into a groove 209 near the top of shaft 205. This is shown in FIG. 13, which is a side elevational view of inertial latch 200 taken through cross section 13 shown in FIG. 12. One end of whisker spring 208 is fitted into a cored area 210 in inertial latch 200. The other end of whisker spring 208 is inserted into a slot 211 of which is machined into body 10C. The relative positions of cored area 210, shaft 205 and slot 211 are arranged such that whisker spring is pretensioned and urges inertial latch 200 in a clockwise direction, bringing contact surface 203 into contact with outer crash stop block 206. The seating of whisker spring 208 in groove 209 retains inertial latch 200 on shaft 205. Inertial latch 200 may also be retained on shaft 205 by means of a retaining ring (e.g., an "E"-clip).

Figure 14:
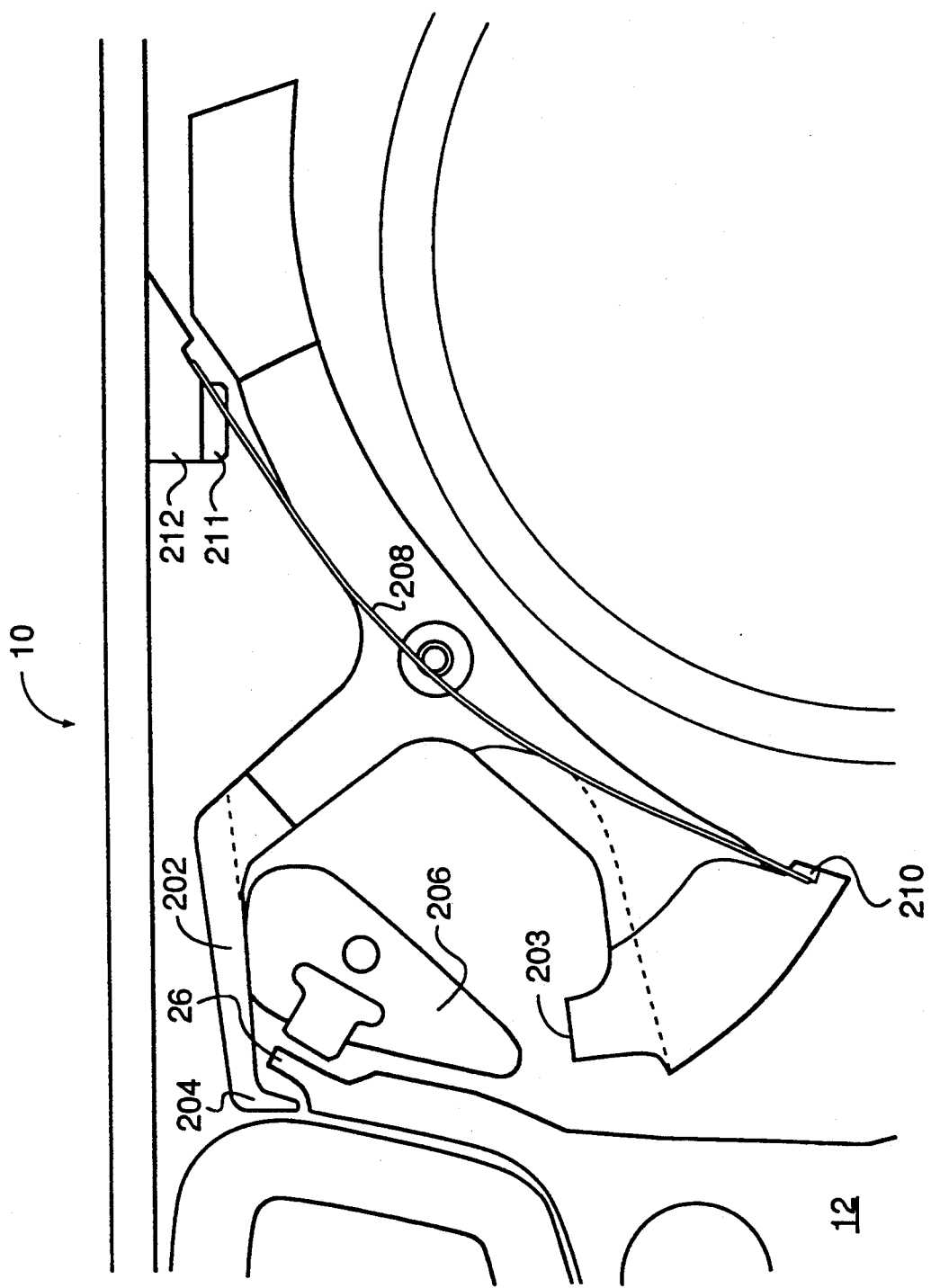
FIG. 14 illustrates the inertial latch of FIG. 10 in a locked position.

Inertial latch 200 is normally in the position shown in FIG. 12. When disk drive 10 experiences a clockwise rotational shock, inertial latch 200 rotates in a counterclockwise direction until the inner edge of pawl 202 comes into contact with a surface of outer crash stop block 206 (see FIG. 14). In this position hook 204 will engage finger 26 so as to prevent actuator 12 from rotating. Once the shock has passed, whisker spring 208 will urge inertial latch 200 towards its normal position, where surface 203 makes contact with outer crash stop block 206. The placement of whisker spring 208 on top of inertial latch 200 minimizes friction and thereby maximizes the response speed of inertial latch 200 to a rotational shock.

Figure 15:
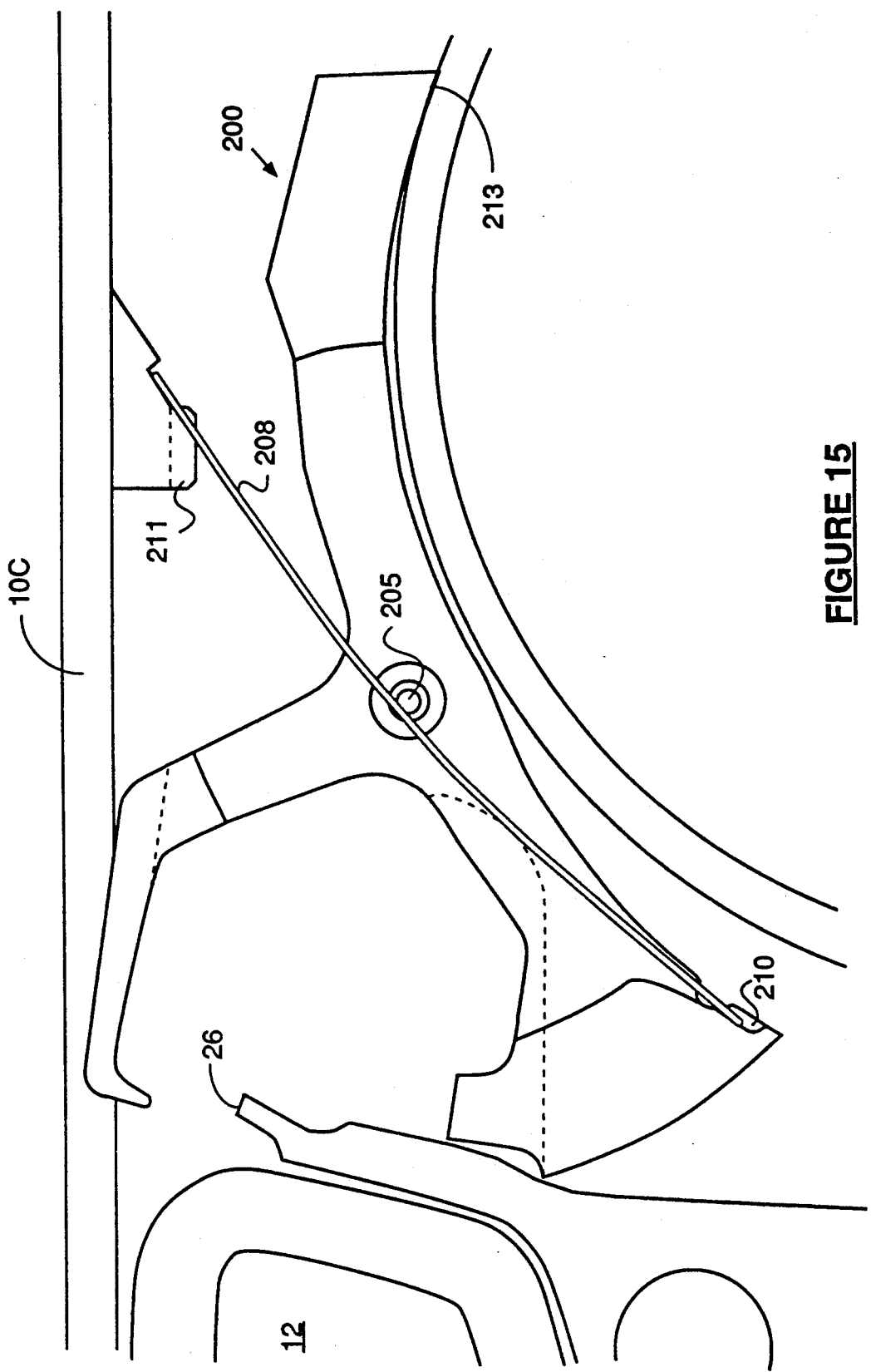
FIG. 15 illustrates the manner of mounting the inertial latch of FIG. 10.

The ease of assembling this embodiment makes it particularly attractive. As shown in FIG. 15, inertial latch 200 is simply fitted onto shaft 205 and whisker spring 208 is fitted into cored area 210, groove 209 and slot 211. Inertial latch 200 is preferably installed before outer crash stop block 206, and a surface 213 of body 10C acts as a stop for inertial latch 200 during installation. Installing inertial latch 200 in this sequence may make it easier to install actuator 12.

The foregoing examples of various embodiments and aspects in accordance with this invention are intended to be illustrative only and not in any manner limiting of the full scope of this invention. Those skilled in the art will be able to recognize or conceive of numerous alternative embodiments which are within the broad scope and principles of this invention.

We claim:

1. A disk drive for storing and/or retrieving information comprising:
   a disk comprising a storage medium and rotatable about an axis;
   means for rotating said disk;
   an actuator rotatable about a pivot and comprising a head for writing information on and/or reading information from said storage medium; and
   an inertial latch for preventing a rotational shock force acting on said disk drive from rotating said actuator with respect to said disk drive, said inertial latch comprising:
   an inertial body rotatable about an axis;
   engagement means joined to said inertial body, said engagement means being capable of engaging said actuator so as to prevent said actuator from rotating about said pivot point when said disk drive is subjected to a rotational shock force; and
   prevention means for preventing said engagement means from engaging said actuator when said disk drive is not being subjected to a rotational shock force.

2. The disk drive of claim 1 wherein said engagement means comprises a pin joined to said inertial body.

3. The disk drive of claim 1 wherein said prevention means comprises a spring connected to said inertial body.

4. The disk drive of claim 1 wherein said disk drive is a dynamic loading disk drive.

5. The disk drive of claim 4 which also comprises a second latch means for preventing said head from making contact with said disk, said second latch means not being activated by a rotational force imposed on said disk drive.

6. The disk drive of claim 5 wherein said second latch means comprises a cam follower joined to said actuator, and a ramp, said second latch means operating at least in part by means of friction between said cam follower and said ramp.

7. The disk drive of claim 1 wherein said disk drive is a contact start/stop disk drive.

8. The disk drive of claim 1 wherein said storage medium is a magnetic material.

9. The disk drive of claim 1 wherein said storage medium is a magneto-optic material.

10. The disk drive of claim 1 wherein said actuator includes an electrically conductive coil and wherein said actuator is driven by a voice coil motor.

11. The disk drive of claim 1 wherein said inertial body comprises a pawl, said pawl engaging said actuator when said disk drive is subjected to a rotational force.

12. The disk drive of claim 1 wherein said inertial body comprises bronze filled nylon.

13. The disk drive of claim 1 wherein said inertial body is pivotable about a shaft and said prevention means comprises a spring coiled about said shaft and attached to said inertial body.

14. The disk drive of claim 13 wherein said inertial latch includes a sleeve into which said shaft is journaled, said sleeve being fitted into said inertial body, said spring being attached to said sleeve.

15. The disk drive of claim 14 wherein said sleeve comprises a plastic.

16. The disk drive of claim 15 wherein said sleeve comprises Teflon TM filled polycarbonate.

17. The disk drive of claim 1 wherein said inertial body comprises an arm and a pawl, said pawl engaging said actuator when said disk drive is subjected to a rotational force.

18. The disk drive of claim 17 comprising a stop member mounted between said arm and said pawl, said stop member being in the path of said arm and said pawl as said inertial body rotates with respect to said disk drive, said stop member limiting the rotation of said inertial body between first and second extremes, said first extreme occurring where said arm contacts said stop member and said second extreme occurring where said pawl contacts said stop member.

19. The disk drive of claim 18 wherein said prevention means comprises a spring which maintains said inertial body in said first extreme when said disk drive is not subjected to a rotational force.

20. The disk drive of claim 19 wherein said spring comprises a whisker spring.

21. The disk drive of claim 20 wherein said whisker spring has two ends, one end of said whisker spring is fixed to said inertial body, the other end of said whisker spring is fixed to a body member of said disk drive, and a surface of said whisker spring between said two ends engages a shaft about which said inertial body rotates, said whisker spring being pretensioned to bias said inertial body so as not to prevent rotation of said actuator.

* * * * *